United States Patent [19]

Christensen et al.

[11] Patent Number: 4,891,141
[45] Date of Patent: * Jan. 2, 1990

[54] OXYGEN SCAVENGER FOR BOILER WATER AND METHOD OF USE

[75] Inventors: Ronald J. Christensen, Montgomery; Lyle H. Steimel, Forest Park, both of Ohio

[73] Assignee: DuBois Chemicals, Inc., Cincinnati, Ohio

[ * ] Notice: The portion of the term of this patent subsequent to Oct. 17, 2006 has been disclaimed.

[21] Appl. No.: 131,754

[22] Filed: Dec. 11, 1987

[51] Int. Cl.$^4$ ............................ C02F 1/20; C23F 11/14
[52] U.S. Cl. ..................................... 210/750; 252/178; 252/188.28; 252/392; 422/16; 422/17
[58] Field of Search ................. 210/750, 757; 252/178, 252/188.28, 392, 396, 403, 407; 422/11, 14, 16, 17, 13

[56] References Cited

U.S. PATENT DOCUMENTS

| | | | |
|---|---|---|---|
| 3,329,607 | 7/1967 | Colobert et al. | 210/764 |
| 3,637,772 | 1/1972 | Klaui et al. | 260/398.5 |
| 3,681,492 | 8/1972 | Kotzbauer | 424/141 |
| 3,749,680 | 7/1973 | Hinkley | 252/400 A |
| 4,419,327 | 12/1983 | Kelly | 422/17 |
| 4,549,968 | 10/1985 | Muccitelli | 210/750 |
| 4,681,737 | 7/1987 | Walker et al. | 210/750 |

FOREIGN PATENT DOCUMENTS

| | | | |
|---|---|---|---|
| 1168950 | 6/1984 | Canada | 210/750 |
| 45-14202 | of 1970 | Japan . | |
| 45-13521 | 5/1970 | Japan . | |

OTHER PUBLICATIONS

Csuros et al., "Investigations on Catalysts", Acta Chim. Acad. Sci. Hung., vol. 14, 1958, pp. 95–106.
Pfizer, "Sodium Erythorbate Technical", Chemicals Division Data Sheet 637, 4/65 reprinted 4/71.

Primary Examiner—Peter Hruskoci
Attorney, Agent, or Firm—Wood, Herron & Evans

[57] ABSTRACT

An oxygen scavenger for boiler water includes ascorbic acid neutralized with diethylaminoethanol. The diethylaminoethanol provides condensate treatment for the long and short steam lines and improves the scavenging of the ascorbic acid.

4 Claims, No Drawings

OXYGEN SCAVENGER FOR BOILER WATER AND METHOD OF USE

BACKGROUND OF THE INVENTION

A recirculating boiler requires an extremely high purity of water in order to avoid a plurality of different problems. Unfortunately the quality of the water available for most boilers is such that the water employed would rapidly cause a deterioration of the boiler eventually requiring a shut down of the boiler and potential replacement of various portions of the boiler.

Currently there are a variety of different problems treated separately by a variety of different compositions. Two very major problems are scale formation and corrosion of the surface of the boiler. These two problems are interrelated in that corrosion of the surface is avoided by maintaining an alkaline pH. Scale formation is a problem which exists at alkaline pH's. Boilers generally operate under alkaline pH conditions and address the scale formation problem by the use of various scale inhibitors and descalants.

Even under alkaline conditions, there is a corrosion problem or pitting attributed to the presence of oxygen in the water. The key to solve this problem is to remove the oxygen. To avoid this problem, the make up water in a boiler is physically treated to deaerate the make up water. Oxygen scavenging chemicals are then added to further reduce the possibility of pitting. Chemicals commonly used for this purpose are sodium sulfite, catalyzed sodium sulfite, hydrazine and catalyzed hydrazine. Also, as disclosed in U.S. Pat. No. 4,419,327 amine neutralized erythorbic acid can be used to scavenge oxygen. Ammonia is the preferred amine disclosed in this patent. Although other amines disclosed in this patent apparently have some catalytic affect on the erythorbic acid, this is not disclosed. Further the use of DEAE is not discussed in this patent. Ascorbic acid has also been discussed as an oxygen scavenger. It is structurally very similar to erythorbic acid, but has greater thermal stability.

Each of these have various problems. Sodium sulfite reacts with oxygen to form sodium sulfate. To scavenge oxygen effectively, eight parts of sodium sulfite are required for each part of dissolved oxygen. Sodium sulfite provides efficient scavenging in medium and low pressure boilers with no harmful by-products. Its use, however, is precluded in boilers operating at or above 1800 psig where the high pressures cause the formation of $SO_2$ and $H_2S$ by thermal decomposition of the chemical.

Hydrazine reacts with equal parts of oxygen to form inert nitrogen and water. Since the products are neutral, this treatment does not increase the dissolved solid concentrations in boiler water. Hydrazine is an effective scavenger at very low levels of application. Unfortunately, since it is volatile itself, it is susceptible to thermal decomposition to ammonium and nitrogen. The evolution of ammonium moreover may restrict hydrazine application to avoid corrosion.

In addition to oxygen pitting, there is a corrosion problem in the after boiler. Water invariably contains carbon dioxide and ammonia. The ammonia may be present in such trace levels that it is insufficient to either cause problems by overconcentration or to help combat the interaction of $CO_2$ with steam which forms carbonic acid in the condensate. Accordingly, volatile neutralizing amines such as cyclohexylamine, morpholine, diethanolamine and diethylaminoethanol are commonly used to combat corrosion in industrial after boiler sections by neutralizing condensate pH. These amines are present only for this purpose and do not have any reported oxygen scavenging affects.

SUMMARY OF THE INVENTION

The present invention is premised on the realization that an improved oxygen scavenging system can be formulated by combining ascorbic acid with a neutralizing amine and specifically diethylaminoethanol. The oxygen scavenging effect of the ascorbic acid in combination with the diethylaminoethanol (DEAE) is greater than the oxygen scavenging effect of the ascorbic acid neutralized with sodium hydroxide. When added to boiler water in effective amounts, this composition provides both oxygen scavenging and condensate treatment as well as metal passivation. In addition, the DEAE has an intermediate distribution ratio which provides condensate treatment for both long and short steam lines. This makes this combination particularly versatile.

The objects and advantages of the present invention will be further appreciated in light of the detailed description.

DETAILED DESCRIPTION

Ascorbic acid is combined with diethylaminoethanol to provide an oxygen scavenging solution which can be added in minor amounts to the make up water of a boiler to chemically scavenge oxygen. The combination of ascorbic acid and DEAE is formed by dissolving the ascorbic acid in water and subsequently adding the DEAE to the ascorbic acid solution. As purchased, the ascorbic acid is a 100% solid dry powder. Alternately, it can be in liquid form and can be neutralized sodium ascorbate.

The ratio by weight of ascorbic acid relative to DEAE can vary substantially and will range from about 1/1 to about 1/15 ascorbic acid to DEAE. The DEAE should be present in sufficient amount to adjust the pH of the ascorbic acid solution to at least about 7. Further, since the DEAE is also providing condensate treatment, it is preferable to add excess DEAE relative to the ascorbic acid raising the pH to at least about 7.5–8.5 in the condensate. Therefore the pH of the product (concentrate) should be about 11. The DEAE once added to the ascorbic acid solution is mixed thoroughly and provides a stable solution of ascorbate and diethylaminoethanol.

No further treatment of the solution is necessary. However, if the DEAE added does not increase the pH to about 10 added base may be needed to prevent bacterial growth.

The concentrated solution of ascorbic acid and DEAE should be from about 1% to 25% ascorbic acid and 1% to 50% DEAE. Basically, practicality sets the lower limit. A solution with an extremely low concentration will require that a large amount be added. This would be expensive because of shipping and storage costs.

Advantageously, this solution is compatible with many different components of a boiler water treatment system including sulfite, hydrazine, low molecular weight anionic polymers such as polymaleic anhydride, polymethacrylate, polyacrylate and phosphonates as well as soda ash and sodium glucoheptonate. Such a solution is disclosed in our pending application filed concurrently herewith entitled All-In-One Boiler Treatment Composition. These again would simply be added to the solution and mixed in.

The oxygen scavenging solution of the present invention is added to the boiler water at basically any point along the circulating water system of the boiler. Preferably, however, it is added to the deaerator storage sections.

Sufficient oxygen scavenging solution is added to establish or maintain the concentration of the oxygen scavenging solution within the boiler water at a desired and effective oxygen scavenging concentration. Basically, the concentration of the ascorbic acid in the solution must be from about 1 to about 40 parts per million with 10–20 ppm preferred. Ascorbic acid is consumed in use. Therefore the amount added is greater than the amount in the boiler. From about 1 to about 200 parts per million of DEAE should be present, preferably no more than 15 ppm in the steam. In other applications, this may be increased. By maintaining this concentration, the present invention will provide both oxygen scavenging and condensate treatment.

The oxygen scavenging solution or the present invention is effective over a wide range of temperatures and pressure. Basically, the ascorbic acid and DEAE are effective up to about 1500 psi.

The present invention will be further appreciated in light of the following detailed example.

A 10 percent solution of ascorbic acid neutralized with DEAE to a pH of 9.8 was compared to NaOH neutralized ascorbic acid and hydrazine for oxygen scavenging capabilities in a 4 liter flask at room temperature. At 100 ppm the ascorbic acid/DEAE solution was 33% more effective than NaOH neutralized ascorbic acid and more than 100 times more effective than hydrazine under the same conditions.

The present invention provides oxygen scavenging and condensate treatment. Further, in the condensate treatment, the DEAE, improves the efficiency of the oxygen scavengers.

The above has been a disclosure of the method of practicing the present invention as well as the best mode.

However, the invention is defined by the following claims wherein we claim:

1. A method of removing dissolved oxygen from boiler feedwater, providing metal passivation and condensate treatment comprising:

adding to said boiler feedwater an oxygen scavenging amount of a solution of ascorbic acid neutralized with diethylaminoethanol wherein said solution has a ratio of ascorbic acid to diethylaminoethanol at of 1/1 to about 1/5 on a molar basis; and wherein said solution has a pH of at least about 10; and maintaining said solution in said boiler to remove said dissolved oxygen and provide said passivation and condensate treatment.

2. The method claimed in claim 1 wherein said solution is added to said feedwater in an amount sufficient to establish a concentration of at least 1 ppm ascorbic acid.

3. The method claimed in claim 2 wherein sufficient solution is added to establish a concentration of ascorbic acid at at least about 10 ppm.

4. The method claimed in claim 3 wherein the concentration in said feed water of diethylaminoethanol is established at least about 1 ppm.

* * * * *

UNITED STATES PATENT AND TRADEMARK OFFICE
CERTIFICATE OF CORRECTION

PATENT NO. : 4,891,141
DATED : January 2, 1990
INVENTOR(S) : Ronald J. Christensen et al It is certified that error appears in the above-identified patent and that said Letters Patent is hereby corrected as shown below:

At column 4, line 19, "1/5" should be --1/15--.

Signed and Sealed this

Fifth Day of February, 1991

Attest:

HARRY F. MANBECK, JR.

*Attesting Officer*  *Commissioner of Patents and Trademarks*